(12) United States Patent
Vedaraj et al.

(10) Patent No.: US 11,244,215 B2
(45) Date of Patent: Feb. 8, 2022

(54) METHODS AND SYSTEMS FOR PRINTING A DOCUMENT HAVING PAGES WITH DIFFERENT MARGINS

(71) Applicant: XEROX CORPORATION, Norwalk, CT (US)

(72) Inventors: Ashok Jason Vedaraj, Chennai (IN); Thamizh Priyai Thamizhanandan, Chennai (IN); Iswarya Shanmuganathan, Thuraiyur (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/599,152

(22) Filed: Oct. 11, 2019

(65) Prior Publication Data
US 2021/0110223 A1   Apr. 15, 2021

(51) Int. Cl.
G06F 3/13      (2006.01)
G06K 15/02    (2006.01)

(52) U.S. Cl.
CPC ..... *G06K 15/1885* (2013.01); *G06K 15/1805* (2013.01); *G06K 15/1851* (2013.01); *G06K 15/1852* (2013.01); *G06K 15/1868* (2013.01)

(58) Field of Classification Search
CPC .......... G06K 15/1885; G06K 15/1805; G06K 15/1852; G06K 15/1851; G06K 15/1868
See application file for complete search history.

(56) References Cited

U.S. PATENT DOCUMENTS

| | | | | |
|---|---|---|---|---|
| 2003/0189718 A1* | 10/2003 | Yamamura | ............ | G06F 3/1204 358/1.13 |
| 2010/0302565 A1* | 12/2010 | Tanaka | .................. | G06F 3/1256 358/1.9 |
| 2013/0077110 A1* | 3/2013 | Ogino | ................... | G06F 3/1205 358/1.12 |
| 2014/0320896 A1* | 10/2014 | Srivatsan | .............. | G06F 3/1204 358/1.15 |
| 2015/0254539 A1* | 9/2015 | Fujita | .................... | G06F 3/1208 358/1.2 |

* cited by examiner

*Primary Examiner* — Huo Long Chen
(74) *Attorney, Agent, or Firm* — Jones Robb, PLLC (57) ABSTRACT

The present disclosure discloses methods and systems for printing a document having pages with different margins. The method includes receiving a document having a plurality of pages for printing, wherein the document having a combination of pages to be printed in first pre-determined sheets and second pre-determined sheets. A margin value for each page of the document is automatically identified. Based on the identification, one or more pages having margin value greater than a pre-defined margin value is automatically identified. The one or more pages with greater margin value are marked to be printed in the first pre-determined sheets and the remaining pages are marked to be printed in the second pre-determined sheets. Finally, information is sent to a printer to print the one or more pages having a greater margin value in the first pre-determined sheets and to print the remaining pages in the second pre-determined sheets.

28 Claims, 7 Drawing Sheets

METHODS AND SYSTEMS FOR PRINTING A DOCUMENT HAVING PAGES WITH DIFFERENT MARGINS

TECHNICAL FIELD

The present disclosure relates generally to the field of printing and, relates to systems and methods for printing a document having pages with different margins.

BACKGROUND

These days, printing using a multi-function device, or a printer has become as easy task for users but sometimes, performing printing operations require significant human intervention. For example, sometimes a user may have a document having a plurality of pages, where some pages may need to be printed in a letterhead format whereas other pages may have to be printed in a standard format such as A4 sheets. In order to print such a document, the user needs to manually select a format for each page of the document, i.e., whether he wishes to print a particular page in letterhead format or in A4 sheets or needs to print based on the page selection. Sometimes, the user needs to perform the jobs multiple times and thus, need to change the paper settings manually for each job. This method involves more user's intervention and becomes tedious at times. Moreover, the user may have to regularly provide inputs ensuring that each page is printed according to its corresponding format. This would of course become a cumbersome task and therefore, causes inconvenience to the user. This inconvenience becomes more prominent when the document includes a large number of pages, i.e., hundreds, for example. Currently, there is no solution in the market that allows printing of documents with different page formats, without human intervention/input. Therefore, there is a need for efficient yet simple methods and systems for handling documents having a combination of pages, i.e., pages having different margins.

SUMMARY

According to aspects illustrated herein, a computer-implemented method, executable by a processor, for submitting a document for printing is disclosed. The method includes receiving a document having a plurality of pages for printing, wherein the document having a combination of pages to be printed in first pre-determined sheets and second pre-determined sheets. A margin value for each page of the document is automatically identified. Based on the identification, one or more pages having margin value greater than a pre-defined margin value is automatically identified. The one or more pages with greater margin value are marked to be printed in the first pre-determined sheets and the remaining pages are marked to be printed in the second pre-determined sheets. Finally, information is sent to a printer to print the one or more pages having a greater margin value in the first pre-determined sheets and to print the remaining pages in the second pre-determined sheets.

According to other aspects illustrated herein, a computing device for submitting a document for printing is disclosed. The computing device is communicatively coupled to a printer. The computing device includes a print driver running on the computing device to provide a pre-defined option to a user for selection; receive a document having a plurality of pages for printing, wherein the document having a combination of pages to be printed in first pre-determined sheets and second pre-determined sheets; automatically identify a margin value for each page of the document; based on the identification, identify one or more pages having margin value greater than a pre-defined margin value; automatically mark the one or more pages with greater margin value to be printed in the first pre-determined sheets and mark the remaining pages to be printed in the second pre-determined sheets; and send information to the printer to print the one or more pages with greater margin value in the first pre-determined sheets and remaining pages in the second pre-determined sheets.

According to further aspects illustrated herein, a system for printing a document is disclosed. The system includes a computing device, communicatively coupled to a printer, and the printer. The computing device includes a print driver running on the computing device to provide a pre-defined option to a user for selection; receive a document having a plurality of pages for printing, wherein the document having a combination of pages to be printed in first pre-determined sheets and second pre-determined sheets; automatically identify a margin value for each page of the document; based on the identification, identify one or more pages having margin value greater than a pre-defined margin value; automatically mark the one or more pages with greater margin value to be printed in the first pre-determined sheets and mark the remaining pages to be printed in the second pre-determined sheets; and send information to the printer to print the one or more pages with greater margin value in the first pre-determined sheets and remaining pages in the second pre-determined sheets. The printer includes a first tray loaded with the first pre-determined sheets and a second tray loaded with the second pre-determined sheets. The printer is to print the pages with greater margin value in the first pre-determined sheets and print the remaining pages in the second pre-determined sheets, without any manual intervention.

According to additional aspects illustrated herein, a non-transitory computer-readable medium including instructions executable by a processor. The processor is to receive a document having a plurality of pages for printing, wherein the document having a combination of pages to be printed in first pre-determined sheets and second pre-determined sheets; automatically identify a margin value for each page of the document; based on the identification, identify one or more pages having margin value greater than a pre-defined margin value; automatically mark the one or more pages with greater margin value to be printed in the first pre-determined sheets and mark the remaining pages to be printed in the second pre-determined sheets; and send information to a printer to print the one or more pages with greater margin value in the first pre-determined sheets and remaining pages in the second pre-determined sheets.

Other and further aspects and features of the disclosure will be evident from reading the following detailed description of the embodiments, which are intended to illustrate, not limit, the present disclosure.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "printer" is a single device or a combination of devices to perform printing. The printer may have other functionalities including, but are not limited to, scanning, copying, imaging, faxing and so on. The printer includes software, hardware, firmware, or a combination thereof. The printer may participate in a network and communicate with various devices, users, or any combination thereof. In context of the present disclosure, the printer prints documents having a combination of pages with different margins without human intervention. The printer may include a number of trays having different sheets. For example, one tray may have letterhead, second tray may have A4 sheets and third tray may have A3 sheets and so on.

The term "computing device" refers to a device that the user typically uses for day-to-day tasks such as giving print commands and other purpose. Examples of the computing device include, but are not limited to, a personal computer, a laptop, a mobile phone, a tablet, PDA, a smart-phone or any other device capable of data communication. A print driver runs on the computing device enabling the user to submit documents for printing. In context of the present disclosure, the print driver analyzes the document to automatically identify pages having margin value greater than a pre-defined margin value and mark pages with greater margin value to be printed in first pre-determined sheets and remaining pages to be printed in second pre-determined sheets.

A "document" represents any document in a suitable format such as, PDF, word document, excel sheet, image, Microsoft presentation (.ppt), and so forth. The document can be in a virtual or software form (embodied in a software file). The virtual form can also be referred to as digital form, electronic version or the like. The document may include content in the form of text, image, graphics or a combination thereof. The output of the document (i.e., after printing) is in a physical form, such as printed on paper. The document is an input to the computing device and is an output by the printer.

The term "pre-defined margin value" refers to include any data which can be associated with a margin size for one or more edges of a sheet. The margin value may be for any of the margins or a combination of the margins, for example, top margin, bottom margin, right margin, and/or left margin. For example, the margin value may be 3 cm left margin, 7 cm right margin, 5 cm top margin, 2.5 cm bottom margin. In other example, the margin value may be 5 cm top margin. The margin value may be a default value set by a system or set by a user/administrator. The margin value may be customized as required.

The first pre-determined sheets refer to sheets for printing pages having greater margin value than the pre-defined margin value such as letterhead. The first pre-determined sheets may have content in the margin place, in the form of image, text, graphics or a combination thereof. But the first pre-determined sheets may be blank. The second pre-determined sheets include sheets for printing pages having margin values less than a pre-defined margin value such as A4 sheets. The second pre-determined sheets may be plain sheets.

Overview

The present disclosure discloses methods and systems for printing documents having different margins. The methods and systems auto detect pages from a document to be printed in different sheets such as letterhead and A4 sheets. The methods and systems further auto detect margins of any pages and automatically print those pages having more margins than standard in letterhead and remaining in standard sheets. Here, the user does not require to do any manual setting for printing in letterhead or standard sheets such as A4.

Exemplary Implementations

Figure 1:
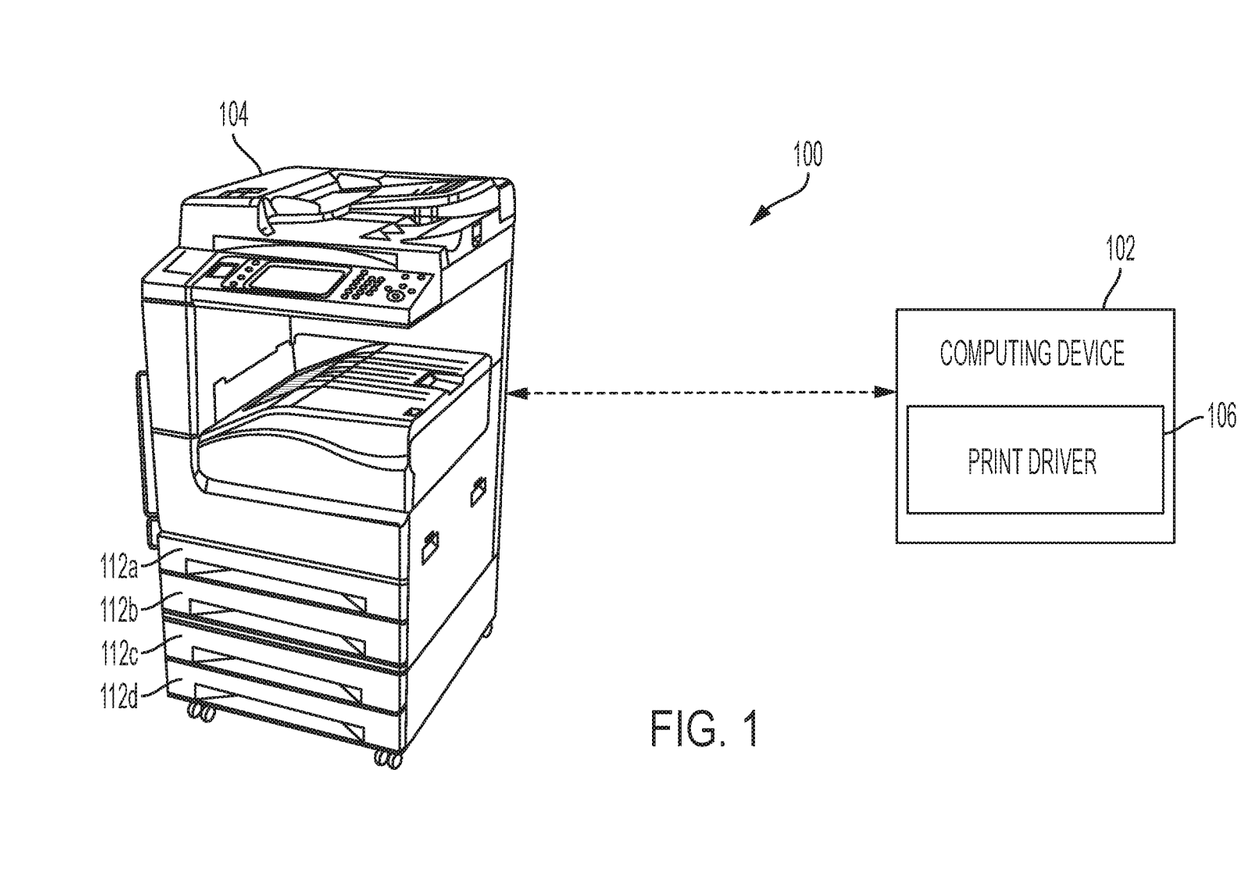
FIG. 1 illustrates an exemplary environment where various embodiments of the disclosure can be practiced.

FIG. 1 illustrates an exemplary environment 100 in which various embodiments of the disclosure can be practiced. The environment 100 incudes a computing device 102 communicatively coupled to a printer 104. The computing device 102 may be used by a number of users for day-to-day tasks such as emails, surfing, business, work, etc. The printer 104 may be used by a number of users for one or more services such as print, email, scan, workflows, copy, fax, or the like. The printer 104 may be a single device or a combination of multiple devices to perform more than one function such as, but not limited to, printing, scanning, imaging, photocopying, and so forth. The printer 104 may include software, hardware, firmware, and a combination thereof. In place of the printer 104, the disclosure may include a multi-function device, a multi-function peripheral device, a multi-function printer, and so on. As shown in FIG. 1, the computing device 102 may be communicatively coupled to other devices such as the printer 104 or other devices via a suitable network (although not shown). The network may be a wired network, a wireless network or a combination of these. The network may be an individual network or a collection of many such individual networks, interconnected with each other and functioning as a single large network, for example, the Internet or an intranet. The network may be implemented as one of the different types of networks, such as intranet, local area network (LAN), wide area network (WAN), the internet, near field communication (NFC), and such networks. The network may either be a dedicated network or a shared network, which represents an association of the different types of networks that use a variety of protocols. The network may include network devices, such as network switches, hubs, routers, HBAs, for providing a communication link between the computing device 102 and other connected devices/systems such as other multi-function device and/or computing devices.

The printer 104 includes a number of trays such as 112a, 112b, 112c, and 112d (collectively, 112). The first tray 112a is loaded with first pre-determined sheets and the second tray 112b is loaded with second pre-determined sheets. The third tray 112c may be loaded with A3 sheets and the fourth tray 112d may be loaded with A2 sheets. For easy understanding, the disclosure will be discussed with respect to the first tray 112a, and the second tray 112b. The first pre-determined sheets are different from the second pre-determined sheets, for example, with respect to a format. The first pre-determined sheets may be letterhead and the second pre-determined sheets may be A4 sheets.

Figure 3A:
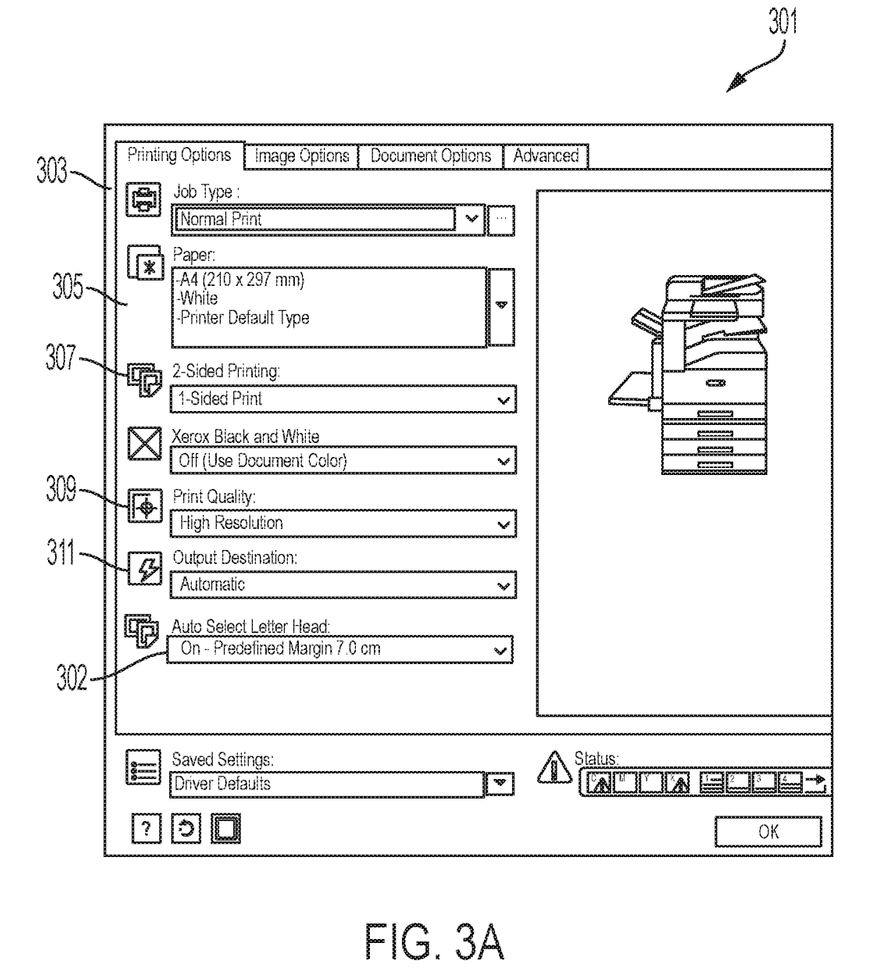
FIGS. 3A, 3B and 3C illustrate exemplary user interface of a device.

The computing device 102 is a device having capability to communicate with the printer 104 for printing purpose etc. A print driver 106 runs on the computing device 102 enabling a user to submit documents for printing along with a number of print attributes. Various examples of the print attributes may be output, quality, destination, a number of copies, black & white print, color print, etc. In context of the present disclosure, the print driver 106 includes a pre-defined option 302 such as "Auto select letterhead" as shown in FIG. 3A. The user selects the option 302 and the selected option 302 includes a pre-defined margin value as set. The pre-defined margin value may be set by default by an administrator at the time of installing the print driver 106 on the computing device or at later stages. However, the pre-defined margin value may be customised by the user or by the administrator at later stages depending on the requirement. Based on the selected option 302, the print driver 106 recognizes that the document includes pages having different margins. The print driver 106 automatically analyses the document to identify pages having different margins. The print driver 106 identifies a margin value for each page of the document and compares the identified margin value with the pre-defined margin value. If the identified margin value of a page is greater than the pre-defined margin value, the page is marked to be printed in first pre-determined sheets. The print driver 106 performs the analysis and identification for each page. Post this, the print driver 106 marks pages having greater margin values to be printed in the first pre-determined sheets and remaining pages, i.e., pages having margin value less than the pre-defined value to be printed in the second pre-determined sheets.

The print driver 106 sends the document and information to print the pages having margin value greater than the pre-defined value to be printed in the first pre-determined sheets and remaining pages, i.e., pages having margin value less than pre-defined value to be printed in the second pre-determined sheets, to the printer 104 in a pre-defined format. The print driver 106 sends the document and the information to the printer 104 in a format readable and understandable by the printer 104.

The printer 104 receives the document and the information sent by the print driver 106. The printer 104 analyses the information and performs printing operation accordingly. The printer 104 initiates printing of the document in the same order as pages are outlined in the document. The printer 104 prints the one or more pages with greater margin value in the first predetermined sheets and prints the remaining pages having less margin value in the second pre-determined sheets, without any intervention. The printer 104 pickup sheets from the first tray 112a to print the one or more pages having greater margin value and pickup sheets from the second tray 112b to print the remaining pages, i.e., pages having less margin values. In this manner, the printer 104 prints the document having pages with different margins without any intervention.

Figure 2:
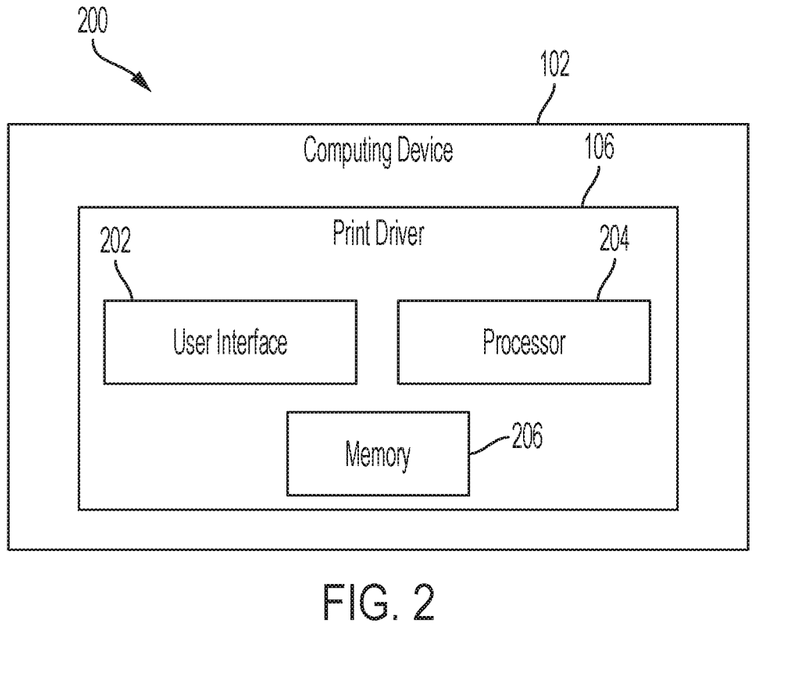
FIG. 2 illustrates a block diagram of a computing device, according to an embodiment of the present disclosure.

FIG. 2 illustrates a block diagram 200 of a device such as a computing device 102, according to an embodiment of the present disclosure. For the sake of brevity, features of the present disclosure that are already disclosed in the description of FIG. 1 are not explained in detail in the description of FIG. 2. The computing device 102 includes a print driver 106 having a user interface 202, a processor 204, and a memory 204.

The processor 204 may be configured to fetch and execute computer readable instructions stored in the memory 206. The processor 204 may be implemented as one or more microprocessors, microcomputers, microcontrollers, digital signal processors, central processing units, state machine, logic circuitries or any devices that manipulate signals based on operational instructions. The user interface 202 may facilitate multiple communications within wide variety of communication protocol(s) and network(s), including wired network(s) and/or wireless network(s). Further, the user interface 202 may include a variety of software and hardware interfaces. The user interface 202 may include, but is not limited to, peripheral devices, such as a keyboard, a mouse, an external memory, and/or a printer. The user interface 202 may facilitate multiple communications within wide variety of communication protocol(s) and network(s), as explained above. The memory 206 may include any non-transitory computer-readable medium. In one example, the non-transitory computer-readable medium may be a volatile memory, such as static random-access memory and a non-volatile memory, such as read-only memory, erasable programmable ROM, and flash memory.

A user uses a computing device such as a computing device 102 for daily tasks such as work, surfing, emails, submitting documents for printing. The user has a document which he wishes to print. The document includes a plurality of pages. Each page may have a page number and has content in the form of text, image, graphics or a combination thereof. One or more pages of the document may have different margins than remaining pages of the document. The user submits the document for printing through the print driver 106. The print driver 106 provides a user interface 202 to the user. Through the user interface 202, the user submits several print parameters for printing as discussed above. In context of the present disclosure, the user interface 202 of the print driver 106 includes a pre-defined option "auto select letterhead." The user selects the option and the selection of the option allows the processor 204 to automatically identify pages having different margins, mark those pages and submit those marked pages to a printer such as 104 for printing. The user submits the document for printing along with all print parameters. The print driver 106 receives the document for printing and starts processing the document. The print driver 106 receives the selection of the pre-defined option.

Upon receiving the document, the processor 204 analyses the document to identify a margin value for each page of the document. The margin value may be a top margin value, a bottom margin value, a left margin value and a right margin value. The processor 204 compares the identified margin value of each page with a pre-defined margin value. Based on the comparison, the processor 204 further identifies one or more pages having a margin value greater than the pre-defined value. The processor 204 marks the pages having greater margin value to be printed in first pre-determined sheets and marks remaining pages having margin value less than the pre-defined value to be printed in second pre-determined sheets. The processor 204 sends information to the printer 104 for printing, the information includes the document and the information to print the one or more pages having the greater margin value in the first pre-determined sheets and remaining pages in the second pre-determined sheets. In the manner, the print driver 106 submits the document and required information to the printer 104 for printing.

The printer 104 receives the document and information from the print driver 106. The printer 104 checks the information and initiates the printing in accordance with the information received. The printer 104 prints the one or more pages with greater margin value in the first pre-determined sheets and the remaining pages in the second re-determined sheets, without changing the original sequence of the pages in the document and without any intervention. For printing the one or more pages having greater margin value, the printer 104 picks the sheets from the first tray and for printing the remaining pages, the printer 104 picks up sheets from the second tray. For example, if the user submits the document of 5 pages, where page 3 is to be printed in letterhead format and pages 1, 2, 4 and 5 in A4 sheets, then the printer 104 first prints pages 1 and 2 in A4 sheets, then page 3 in letterhead and after that, pages 4 and 5 in A4 sheets again. Here, the printer 104 picks sheets from the second tray for printing pages 1 and 2, then picks sheets from the first tray for page 3 and thereafter, picks sheets from the second tray for pages 4 and 5.

In embodiments discussed above, the margins can be identified based on the margin values, but other methods may be used. For example, the margin can be identified based on the presence of a watermark in one or more pages of the document. The watermark may be in the form of an image. The watermark indicates that the pages to be printed in first pre-determined sheets such as letterhead. Based on the presence of watermark, the print driver 106 marks pages with the watermark to be printed in the first pre-determined sheets and remaining pages to be printed in the second pre-determined sheets. In this manner, the printer 104 prints the document having a combination of pages to be printed in different pre-determined sheets or document having pages with different margins.

Figure 3B:
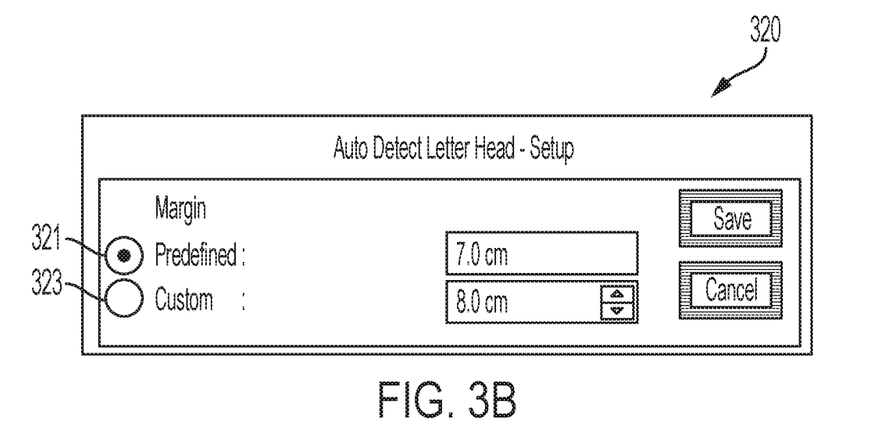
Figure 3C:
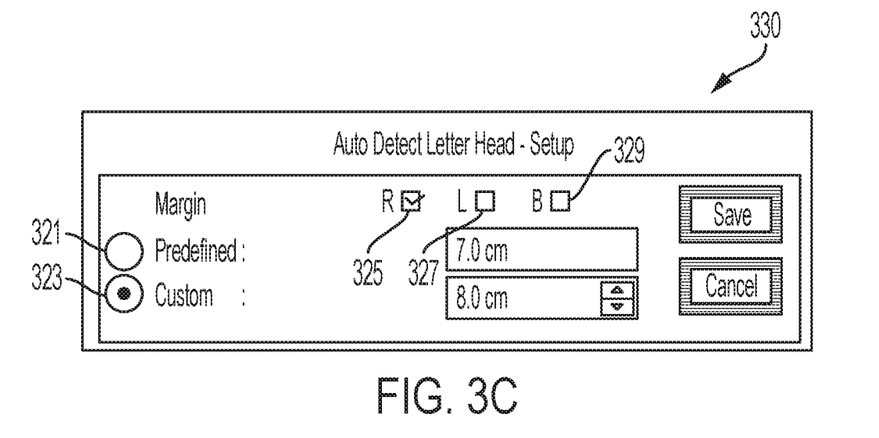
Figure 4A:
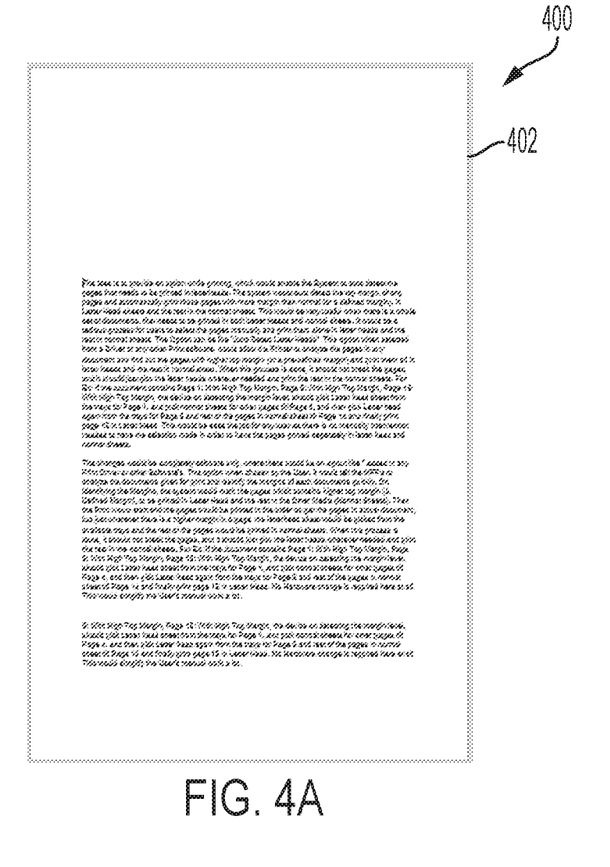
FIGS. 4A-4E represent an exemplary document having a combination of pages to be printed on different sheets.
Figure 4B:
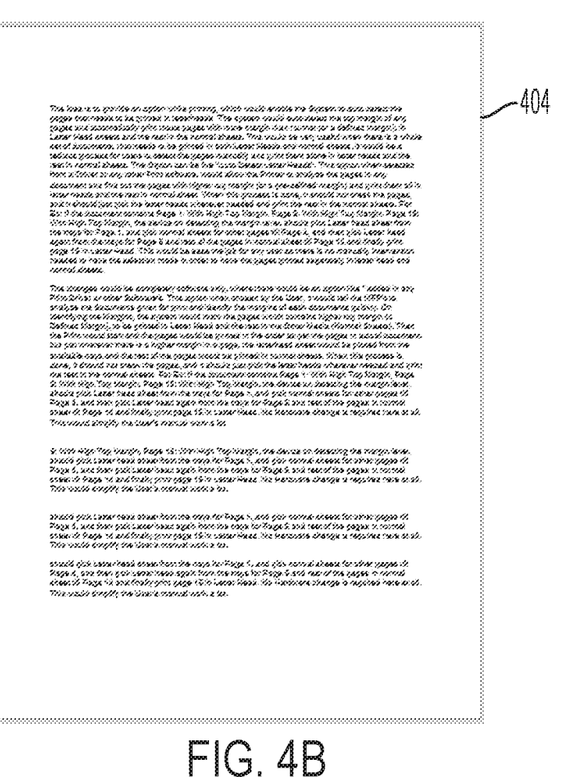
Figure 4C:
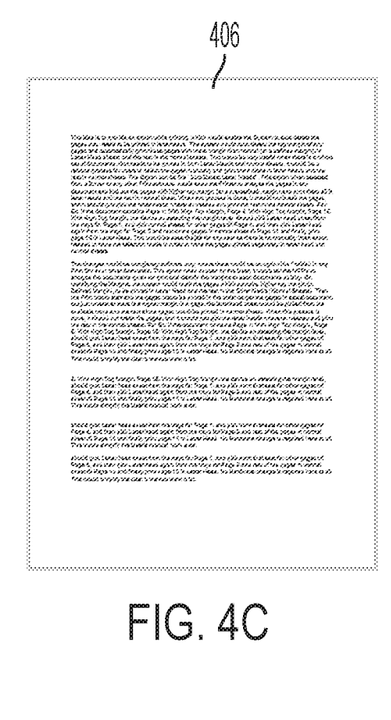
Figure 4D:
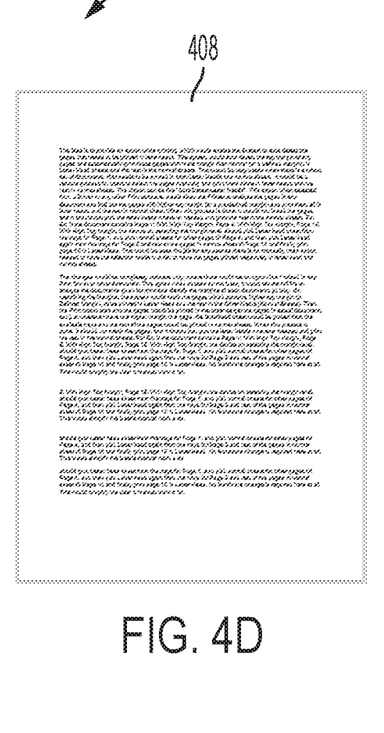
Figure 4E:
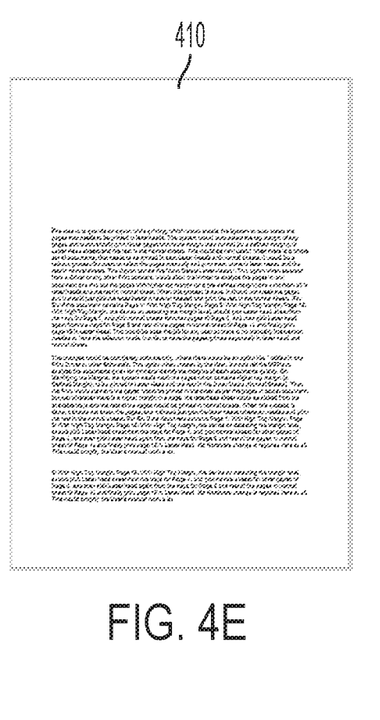

FIG. 3A illustrates an exemplary user interface 301 of a print driver such as print driver 106. The user interface 301 allows a user to submit a number of print attributes such as job type (marked as 303), paper (marked as 305), 2-sided printing (marked as 307), print quality (marked as 309), output destination (marked as 311) and so on. In context of the present disclosure, the user interface 301 provides an option 302—auto select letterhead option, the option 302 includes a pre-defined margin value or may be customized by the user. Upon selecting the option 302, a dialog box 320 is shown, refer to FIG. 3B. The dialog box 320 includes two options, a pre-defined option 321 and custom option 323. The pre-defined option 321 includes a margin value as set by an administrator or a default value. The default margin may be set for the top margin, but the user can customize the margin value and the type using the custom option 323. Upon selecting the custom option 323, the dialog box 330 as shown in FIG. 3C appears. The custom option 323 allows the user to set a margin value as defined by the user and further allows the user to set a right margin (marked as 325), a left margin (marked as 327) and a bottom margin (marked as 329). The user can select the margin type using a check box. The user can select either of the options 321 and 323 via radio button. For example, the pre-defined margin value may be 7 cm. The user can opt for either the pre-defined margin 321 or the custom margin 323 to specify their own margin and save the settings.

FIGS. 4A-4E show a document 400 having a plurality of pages as page 1 (marked as 402), page 2 (marked as 404), page 3 (marked as 406), page 4 (marked as 408) and page 5 (marked as 410). As seen clearly, pages 1 (marked as 402) and page 5 (marked as 410) have margins different than remaining pages 2-4 (marked as 404, 406 and 408). Specifically, top margins of pages 1 and 5 have greater margin value than the pre-defined value while remaining pages 2-4 have standard top margin values. Here, pages 1 and 5 are printed on first pre-determined sheets such as letterhead and remaining on A4 sheets.

Figure 5:
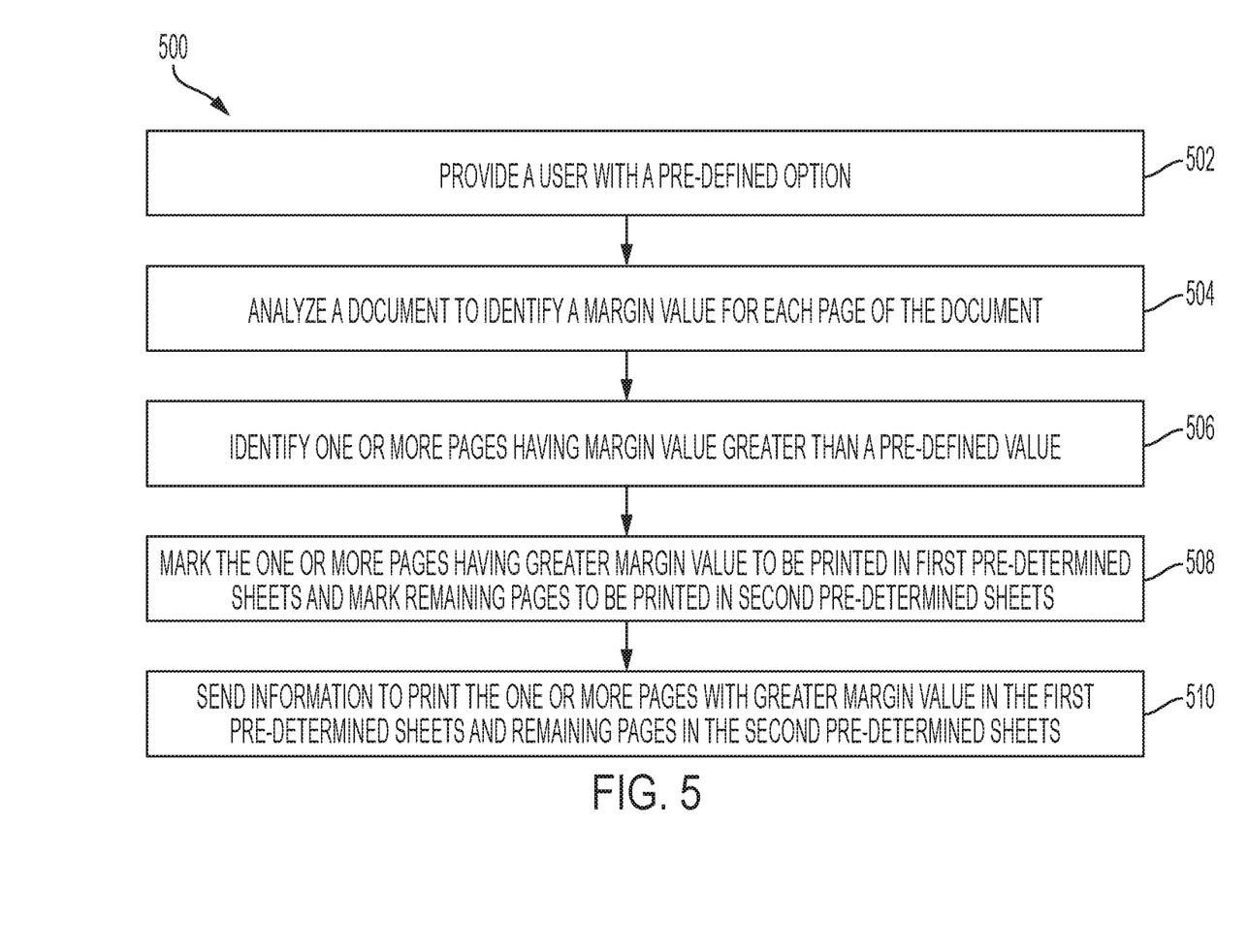
FIG. 5 is a method flowchart for submitting a document for printing and printing the document.

FIG. 5 illustrates a computer-implemented method 500 for submitting a document for printing, according to an embodiment of the present disclosure. The computer-implemented method 500 is hereinafter referred to as the method 500. In an embodiment, the method 500 is executable by a processor. For the sake of brevity, features of the present disclosure that are already explained in the description of FIGS. 1-4 are not explained in detail in the description of FIG. 5. Some blocks of the method 500 may be implemented at a computing device side, while some blocks of the method 500 may be implemented a printer side. The method 500 is a complete method detailing submitting a document for printing and printing the document.

At Computing Device

The method 500 begins when a user wishes to submit a document for printing. The document includes content in the form of text, images, graphics or a combination thereof. The document includes a plurality of pages, where some pages of the document are to be printed in first pre-determined sheets such as letterhead and remaining pages to be printed in second pre-determined sheets such as A4. Each page may have a page number, margin values, etc. The pages to be printed in the first pre-determined sheets have different margin values than pages to be printed in the second pre-determined sheets.

The first pre-determined sheets may have pre-defined text or image. In other examples, the first pre-determined sheets may be blank. Letterhead may be blank or may have pre-defined content such as logo of the company or name of the company. The second pre-determined sheets may be standard A4 sheets, i.e., plain A4 sheets At 502, a user is provided with a pre-defined option such as "auto detect letterhead." The user selects the pre-defined option when some pages of the document need to be printed in letterhead, for example, and some pages in A4 sheets. The selection of the pre-defined option is received. Upon receiving the document and the selection of the document, the document is analyzed. The document is analyzed where each page of the document is analyzed to identify a margin value of each page at 504. The margin value of each page is compared with a pre-defined margin value, for example, top margin. The margin value may be a bottom margin value, a left margin value, and a right margin value. Based on the comparison, at 506, one or more pages having margin value greater than the pre-defined value are identified. At 508, upon identification, the one or more pages with greater margin value are marked to be printed in the first pre-determined sheets such as letterhead and remaining pages are marked to be printed in the second pre-determined sheets. At 510, information is sent to a printer to print the one or more pages with greater margin value in the first pre-determined sheets and remaining pages in the second pre-determined sheets. Here, pages to be printed in the first pre-determined sheets are sent to first tray loaded with the first pre-determined sheets and pages to be printed in the second pre-determined sheets are sent to the second tray.

At Printer Side

The information to print the one or more pages with greater margin value in the first pre-determined sheets and remaining pages in the second pre-determined sheets is received. Based on the information received, the one or more pages with greater margin value are printed in the first pre-determined sheets and remaining pages are printed in the second pre-determined sheets. The first pre-determined sheets are loaded in the first tray and the second pre-determined sheets are loaded in the second tray. Sheets are picked from the first tray to print the one or more pages with greater margin value and sheets are picked from the second tray to print the remaining pages. The first tray loaded with the first pre-determined sheets and the second tray with the second pre-determined sheets are loaded.

In some embodiments, the document is analyzed to identify presence of a watermark. The pages with the watermark are identified and are marked to be printed in the first pre-determined sheets and remaining pages to be printed in the second pre-determined sheets. The watermark may indicate pages to be printed in letterhead. For example, the watermark may be letterhead image.

In an example, it is considered that a user submits a document having 15 pages for printing. Of the 15 pages, the user wants 3 pages to be printed in a letterhead sheets and the remaining pages to be printed in normal sheets such as A4. The pages to be printed in the letterhead may be page number 1, page number 5, and page number 15. Here, the user does not require to provide any information, but the print driver analyses the documents and identifies pages having top margins greater than 7 cm. The print driver identifies pages 1, 5, 15 to be printed in the letterhead format. The print driver marks pages 1, 5, 15 to be printed from tray loaded with letterhead and mark remaining pages to be printed from the tray loaded with A4 sheets. The printer prints the pages 1, 5 and 15 in letterhead and remaining pages in A4 sheets. Here, the printer does not break the pages but prints the pages in letterhead whenever needed and print the remaining pages in A4 sheets. Here, the printer picks the letterhead from tray 1 for printing page 1 and picks A4 sheets from tray 2 for printing other pages until page 4. The printer again picks the letterhead from tray 1 for printing page 5 and picks A4 sheets from tray 2 for printing pages until page 14, and finally prints page 15 from letterhead sheet from tray 1.

Although the present disclosure is discussed printing the document on different sheets such as letterhead and A4 sheets. But it is understood these are exemplary in nature and the disclosure can be implemented for different sheets. The present disclosure allows a user to select a pre-defined margin value accordingly. For example, the disclosure may provide the user with an option "Custom Margin" under "Auto Detect Letterhead option." The custom margin option allows the user to change the margin based on the requirement. As an example, the requirement may vary for different departments. The custom margin for the HR department may be say "8 cm," but the margin value for the IT department may be "5 cm."

As would be appreciated by a person skilled in the art, although the disclosure is explained with respect to the top margin, the present disclosure is equally implemented for the bottom margin, the right margin, and the left margin, without departing from the scope of the present disclosure.

The present disclosure is discussed with respect to scenarios when a user submits the document for printing via a computing device. But there are scenarios when the user submits the document for printing directly via a printer. For example, the document may be stored in a printer. In other examples, the document may be stored in an external storage device such as a hard disk, a USB or the like. In such cases, the user connects the external storage device to the printer for accessing the document and finally submits the document for printing. In all scenarios, when the user submits the document via the printer, then functionalities as discussed above with respect to the print driver are implemented by the printer. For example, the printer provides a pre-defined option to a user for selection. The printer receives the document including a combination of pages having different margins. The printer identifies a margin value for each page of the document and based on the identification, the printer identifies one or more pages having margin value greater than a pre-defined margin value. The printer marks the one or more pages with greater margin value to be printed in the first pre-determined sheets and mark the remaining pages to be printed in the second pre-determined sheets. The printer finally prints the pages having greater margin value in the first pre-determined sheets and remaining pages in the second pre-determined sheets. The printer compares the identified margin value for each page with the pre-defined margin value. The printer includes a first tray having first pre-determined sheets and second tray having second pre-determined sheets.

The present disclosure can be implemented when a user wishes to print a document having a combination of pages such that some pages need to be printed in two different pre-determined sheets such as letterhead and A4 sheets. Implementing the present disclosure does not require user to manually set paper type for each page or he does not need to manually set or change the paper settings. The print driver automatically identifies pages to be printed on different sheets according to margins. In other words, print driver automatically detects margins of pages and auto select pre-determined sheets from trays of printer. The present disclosure does not involve any user's intervention and also eases the work for the user. The present disclosure nullifies any effort that need to be put in by the user for printing any document having a combination of pages that need to be printed in both, the letterhead and the A4 sheets. There is no manual intervention needed to have the selection made in order to have the pages printed separately in two different sheets such as letterhead and A4 sheets. The disclosure eases the work of large number of users. The disclosure discloses methods and systems for printing documents having pages with different margins, without any intervention. The present disclosure can be implemented in existing printers.

Described and illustrated herein are examples of the disclosure along with some variations. The terms, descriptions and figures used herein are set forth by way of illustration only and are not meant as limitations. Many variations are possible within the scope of the disclosure, which is intended to be defined by the following claims and their equivalents in which all terms are meant in their broadest reasonable sense unless otherwise indicated.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfil described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "identifying," or "determining," or "receiving," or, printing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and other.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-implemented method, executable by a processor, for submitting a document for printing, the method comprising:
   receiving a document having a plurality of pages for printing, the document having a combination of pages to be printed in first pre-determined sheets and second pre-determined sheets;
   displaying a print driver user interface including an auto-select letterhead option;
   displaying a dialog box upon selection of the auto-select letterhead option on the print driver user interface, the dialog box including a custom option and a pre-defined option, wherein selection of either one of the custom option and pre-defined option sets a threshold margin value;
   automatically identifying a margin value for each page of the document in response to user selection of the auto-select letterhead option;
   based on the identification, automatically identifying one or more pages having margin value greater than the threshold margin value;
   automatically marking the one or more pages with the greater margin value to be printed in the first pre-determined sheets and marking the remaining pages to be printed in the second pre-determined sheets; and
   sending information to a printer to print the one or more pages with the greater margin value in the first pre-determined sheets and to print the remaining pages in the second pre-determined sheets.

2. The method of claim 1, wherein the first pre-determined sheets comprise letterhead sheets.

3. The method of claim 2, further comprising comparing the identified margin value of each page with the threshold value, wherein the identified margin value is a top margin value.

4. The method of claim 1, wherein automatically identifying the margin value further comprises identifying at least one of a top margin value, bottom margin value, left margin value and right margin value.

5. The method of claim 1, wherein the margin value comprises at least one of a top margin value, a bottom margin value, a left margin value and a right margin value.

6. The method of claim 1, further comprising printing the one or more pages with the greater margin value in the first pre-determined sheets and printing the remaining pages in the second pre-determined sheets, without any intervention.

7. The method of claim 1, wherein the first pre-determined sheets are loaded in a first tray and the second pre-determined sheets are loaded in a second tray of the printer.

8. The method of claim 7, further comprising picking up sheets from the first tray to print the one or more pages with the greater margin value and picking up sheets from the second tray to print the remaining pages.

9. The method of claim 1, further comprising analyzing each page of the document to identify the margin value based on the presence of a watermark.

10. The method of claim 9, further comprising marking pages with the watermark to be printed in the first pre-determined sheets and remaining pages to be printed in the second pre-determined sheets.

11. A computing device for submitting a document for printing, communicatively coupled to a printer, the computing device comprising:
   a print driver running on the computing device to:
   display a print driver user interface including an auto-select letterhead option;
   display a dialog box upon selection of the auto-select letterhead option on the print driver user interface, the dialog box including a custom option and a pre-defined option, wherein selection of either one of the custom option and pre-defined option sets a threshold margin value;
   receive a document having a plurality of pages for printing, the document having a combination of pages to be printed in first pre-determined sheets and second pre-determined sheets;
   automatically identify a margin value for each page of the document in response to user selection of the auto-select letterhead option;
   based on the identification, identify one or more pages having margin value greater than the threshold margin value;
   automatically mark the one or more pages with the greater margin value to be printed in the first pre-determined sheets and mark the remaining pages to be printed in the second pre-determined sheets; and
   send information to the printer to print the one or more pages with greater margin value in the first pre-determined sheets and remaining pages in the second pre-determined sheets.

12. The computing device of claim 11, wherein the print driver is to receive the auto-selection of letterhead option, wherein the first pre-determined sheets comprise letterhead sheets.

13. The computing device of claim 12, wherein the print driver is to compare the identified margin value of each page with the margin value, wherein the identified margin value is a top margin value.

14. The computing device of claim 11, wherein the margin value comprises at least one of a top margin value, a bottom margin value, a left margin value and a right margin value.

15. The computing device of claim 11, wherein the printer is to print the one or more pages with the greater margin value in the first pre-determined sheets and print the remaining pages in the second pre-determined sheets, without any manual intervention.

16. The computing device of claim 11, wherein the first predetermined sheets are loaded in a first tray and the second pre-determined sheets are loaded in a second tray of the printer.

17. The computing device of claim 16, wherein the printer is to pick sheets from the first tray to print the one or more pages with the greater margin value and pick sheets from the second tray to print the remaining pages.

18. The computing device of claim 11, wherein the print driver is to analyze each page of the document to identify the presence of a pre-defined watermark.

19. The computing device of claim 11, wherein the print driver is to mark pages with the pre-defined watermark to be printed in the first pre-determined sheets and the remaining pages to be printed in the second pre-determined sheets.

20. A system for printing a document, comprising: a computing device, communicatively coupled to a printer, the computing device comprising a print driver running on the computing device to:
   display a print driver user interface including an auto-select letterhead option;
   display a dialog box upon selection of the auto-select letterhead option on the print driver user interface, the dialog box including a custom option and a pre-defined option, wherein selection of either one of the custom option and pre-defined option sets a threshold margin value;

receive a document having a plurality of pages for printing, the document having a combination of pages to be printed in first pre-determined sheets and second pre-determined sheets;

automatically identify a margin value for each page of the document in response to user selection of the auto-select letterhead option;

compare the identified margin value of each page with the threshold margin value;

based on the comparison, identify one or more pages having a corresponding identified margin value greater than the threshold margin value;

automatically mark the one or more pages with the greater margin value to be printed in the first pre-determined sheets and mark the remaining pages to be printed in the second pre-determined sheets; and send information to the printer to print the one or more pages with greater margin value in the first pre-determined sheets and remaining pages in the second pre-determined sheets; and the printer comprising a first tray loaded with the first pre-determined sheets and a second tray loaded with the second pre-determined sheets, the printer to:

print the pages with greater margin value in the first pre-determined sheets loaded in the first tray and printing the remaining pages in the second predetermined sheets loaded in the second tray, without any manual intervention.

21. The system of claim 20, wherein the print driver is to receive a selection of the auto select letterhead option on the user interface, wherein the first pre-determined sheets comprise letterhead sheets.

22. The system of claim 21, wherein the identified margin value is a top margin value.

23. The system of claim 20, wherein the printer is to pick sheets from the first tray to print the one or more pages with greater margin value and pick sheets from the second tray to print the remaining pages.

24. The system of claim 20, wherein the print driver is to analyze each page of the document to identify the presence of a watermark.

25. The system of claim 20, wherein the print driver is to mark pages with the watermark to be printed in the first pre-determined sheets and remaining pages to be printed in the second pre-determined sheets.

26. A non-transitory computer-readable medium comprising instructions executable by a processor to:

display a print driver user interface including an auto-select letterhead option;

display a dialog box upon selection of the auto-select letterhead option on the print driver user interface, the dialog box including a custom option and a pre-defined option, wherein selection of either one of the custom option and pre-defined option sets a threshold margin value;

receive a document having a plurality of pages for printing, the document having a combination of pages to be printed in first pre-determined sheets and second pre-determined sheets;

automatically identify a margin value for each page of the document in response to user selection of the auto-select letterhead option;

based on the identification, identify one or more pages having margin value greater than the threshold margin value;

automatically mark the one or more pages with greater margin value to be printed in the first pre-determined sheets and marking the remaining pages to be printed in the second pre-determined sheets; and send information to a printer to print the one or more pages with greater margin value in the first pre-determined sheets and remaining pages in the second pre-determined sheets.

27. The non-transitory computer-readable medium of claim 26, wherein the first pre-determined sheets comprise letterhead sheets and the identified margin value is a top margin value.

28. The non-transitory computer-readable medium of claim 26 comprising instructions executable by the processing resource to print the one or more pages with the greater margin value in the first pre-determined sheets and to print the remaining pages in the second pre-determined sheets, without any manual intervention.

* * * * *